US012736970B2

(12) United States Patent
Wang et al.

(10) Patent No.: US 12,736,970 B2
(45) Date of Patent: Sep. 15, 2026

(54) VEHICLE PLATOON INTERSECTION DECISION-MAKING SYSTEM AND METHOD THEREOF

(71) Applicant: AUTOMOTIVE RESEARCH & TESTING CENTER, Changhua Hsien (TW)

(72) Inventors: Kun-Sheng Wang, Changhua Hsien (TW); Tsung-Ming Hsu, Changhua Hsien (TW)

(73) Assignee: AUTOMOTIVE RESEARCH & TESTING CENTER, Changhua Hsien (TW)

( * ) Notice: Subject to any disclaimer, the term of this patent is extended or adjusted under 35 U.S.C. 154(b) by 209 days.

(21) Appl. No.: 18/505,315

(22) Filed: Nov. 9, 2023

(65) Prior Publication Data

US 2025/0155890 A1 May 15, 2025

(51) Int. Cl.

| | |
|---|---|
| ***G05D 1/00*** | (2024.01) |
| ***B60W 30/14*** | (2006.01) |
| ***B60W 30/165*** | (2020.01) |
| ***B60W 30/18*** | (2012.01) |
| ***G08G 1/00*** | (2006.01) |

(52) U.S. Cl.

CPC ......... *G05D 1/0295* (2013.01); *B60W 30/143* (2013.01); *B60W 30/165* (2013.01); *B60W 30/18154* (2013.01); *G05D 1/0293* (2013.01); *G08G 1/22* (2013.01); *B60W 2420/403* (2013.01); *B60W 2420/408* (2024.01); *B60W 2554/802* (2020.02); *B60W 2555/60* (2020.02); *B60W 2556/65* (2020.02)

(58) Field of Classification Search

None

See application file for complete search history.

(56) References Cited

U.S. PATENT DOCUMENTS

2017/0069203 A1* 3/2017 Sharma .................... G08G 1/07
2019/0250639 A1* 8/2019 Xu ........................ G08G 1/0145
2020/0112973 A1* 4/2020 Cross ............... G08G 1/096725
2021/0041893 A1* 2/2021 Matsumoto .......... G05D 1/0293
2022/0097698 A1* 3/2022 Wang ........................ G08G 1/22
2022/0327935 A1* 10/2022 Guney ................... G05D 1/247

(Continued)

*Primary Examiner* — Nada Mahyoob Alqaderi

(74) *Attorney, Agent, or Firm* — BACON & THOMAS, PLLC

(57) ABSTRACT

A vehicle platoon intersection decision-making system includes multiple vehicles. When executing the intersection decision-making process, the captain vehicle determines whether the platoon can pass through the intersection at the current speed command; if yes, the captain vehicle directs each vehicle to maintain travelling at the current speed command to pass through the intersection; if not, the captain vehicle generates a first optimized speed control information through a first speed decision-making process, making the platoon decelerate before reaching the intersection and begin to accelerate at an acceleration critical time point such that the platoon passes through the intersection. When the platoon passes through the intersection at the current speed command, no energy for accelerating or decelerating is wasted. The platoon decelerates first and then begins to accelerate at the appropriate time through the intersection, avoiding or reducing the time spent waiting for traffic lights at the intersection.

11 Claims, 11 Drawing Sheets

(56) References Cited

U.S. PATENT DOCUMENTS

| | | | | |
|---|---|---|---|---|
| 2022/0415180 | A1* | 12/2022 | Zegelaar | G05D 1/0295 |
| 2023/0063010 | A1* | 3/2023 | Zhang | G05D 1/6985 |
| 2025/0046193 | A1* | 2/2025 | Lei | G08G 1/20 |

* cited by examiner

VEHICLE PLATOON INTERSECTION DECISION-MAKING SYSTEM AND METHOD THEREOF

1. FIELD OF THE INVENTION

The present invention relates to an intersection decision-making system and method, and more particularly to a vehicle platoon intersection decision-making system and method.

2. DESCRIPTION OF THE RELATED ART

In recent years, autonomous driving technology has developed rapidly, primarily focusing on three core parts: sensing, decision-making, and controlling. The sensing part uses sensing devices such as radar, LIDAR, and cameras to collect information about the surrounding environment, including object recognition and road conditions. The decision-making part involves path planning and behavior prediction, evaluating various driving options through complex algorithms to determine the safest and best route. Finally, the controlling part translates the decisions into specific control instructions, allowing the vehicle to drive autonomously, including behaviors such as accelerating, decelerating, and making lateral adjustments and turns.

The vehicle platoon employing autonomous driving technology consists of several vehicles moving in a queue, offering more efficient transportation compared to a single vehicle operating autonomously. This has become one of the most in-demand markets in recent years. In addition to implementing the sensing, decision-making, and control aspects mentioned above, the vehicle platoon also includes coordination technology within the vehicles, encompassing complex integrated technologies like communication between vehicles, relative distance sensing, and collective decision-making and control.

When a vehicle platoon employing autonomous driving technology passes through a road intersection, the factors to consider are even more complex than a single vehicle traveling on a single lane. Not only that the overall length of the vehicle platoon is longer, the platoon may also be interrupted by other vehicles during transit. The traffic lights at the intersection might be in a passable or non-passable state, each with different remaining time durations. If the vehicle platoon speeds up and crosses the intersection at an inappropriate time, it may pose a traffic hazard. Conversely, if it slows down and stops despite having enough time to cross, it may reduce the efficiency of the vehicle platoon's transportation or cause traffic congestion.

In conclusion, how to control a vehicle platoon to pass the intersections safely and efficiently is one of the pressing issues that need to be addressed.

SUMMARY OF THE INVENTION

An objective of the present invention is to provide a vehicle platoon intersection decision-making method technique.

To achieve the foregoing objective, the vehicle platoon intersection decision-making system comprises:

a vehicle platoon, comprising multiple vehicles arranged in order, the vehicles including a captain vehicle and multiple member vehicles traveling according to a current speed command; each vehicle respectively comprising:

a communication device; wherein the communication devices of the vehicles are communicatively connected to each other;

a positioning device, generating an absolute position information and a relative position information;

an environment sensing device, generating an environment status information;

a computing device, connected to the communication device to communicate with the other vehicles, connected to the positioning device to receive the absolute position information and the relative position information, and connected to the environment sensing device to receive the environment status information; wherein the computing device of the captain vehicle (hereinafter refer to as the captain computing device) executes an intersection decision-making process, determining whether the vehicle platoon is able to pass through an intersection with the current speed command according to an intersection signal information and an intersection distance information in the environment sensing information, the relative position information of each vehicle, the absolute position information of the captain vehicle, and the current speed command;

if yes, the computing device of the captain vehicle controls the vehicles to maintain traveling with the current speed command, so that the vehicle platoon passes through the intersection;

if no, the computing device of the captain vehicle generates a first optimized speed control information through a first speed decision process, transmits the first optimized speed control information to the other vehicles through the communication device, controlling the vehicle platoon to decelerate before reaching the intersection until an acceleration critical time point, and begins to accelerate, so that the vehicle platoon passes through the intersection.

In the vehicle platoon, every vehicle is equipped with a communication device, a positioning device, an environment monitoring device, and the computing device. The absolute position information, relative position information, and environmental status information generated by each vehicle can at least be synchronized to the captain vehicle through the communication device. The captain vehicle is able to determine the overall status of the vehicle platoon based on the information from each vehicle and generate control signals sent to the other vehicles, that is, member vehicles, to coordinate the progress control of all vehicles accordingly.

When the captain vehicle determines to enter the intersection decision-making process, it first determines whether the vehicle platoon can pass through the intersection with the current speed command, based on the traffic signal information, intersection distance information, current speed command, and position information in the environment sensing information. If yes, the captain vehicle directs the vehicle platoon to continue passing through the intersection at the current speed command. If not, the first optimized speed control information is generated through the first speed decision process, allowing the vehicle platoon to decelerate and delay its arrival time at the intersection. The captain vehicle also continues to determine if the acceleration critical time point is reached based on the aforementioned information, and starts to accelerate when it reaches the acceleration critical time point to pass through the intersection, thus avoiding stopping and waiting at the red light before the intersection.

Through the above intersection decision-making process, the vehicle platoon effectively and safely decides how to pass through the intersection as it approaches the intersection. If it is able to pass directly at the current speed command, there is no need to consume energy on acceleration and deceleration to change the traveling state of the vehicle platoon. If the platoon is unable to pass directly with the current speed command, then the vehicle platoon decelerates first and then begins to accelerate at the appropriate time to pass through the intersection by generating the first optimized speed control information, avoiding or reducing the time of stopping and waiting at traffic lights, thereby improving the smoothness and energy efficiency of the traveling vehicle platoon.

DETAILED DESCRIPTION OF THE INVENTION

Figure 1:
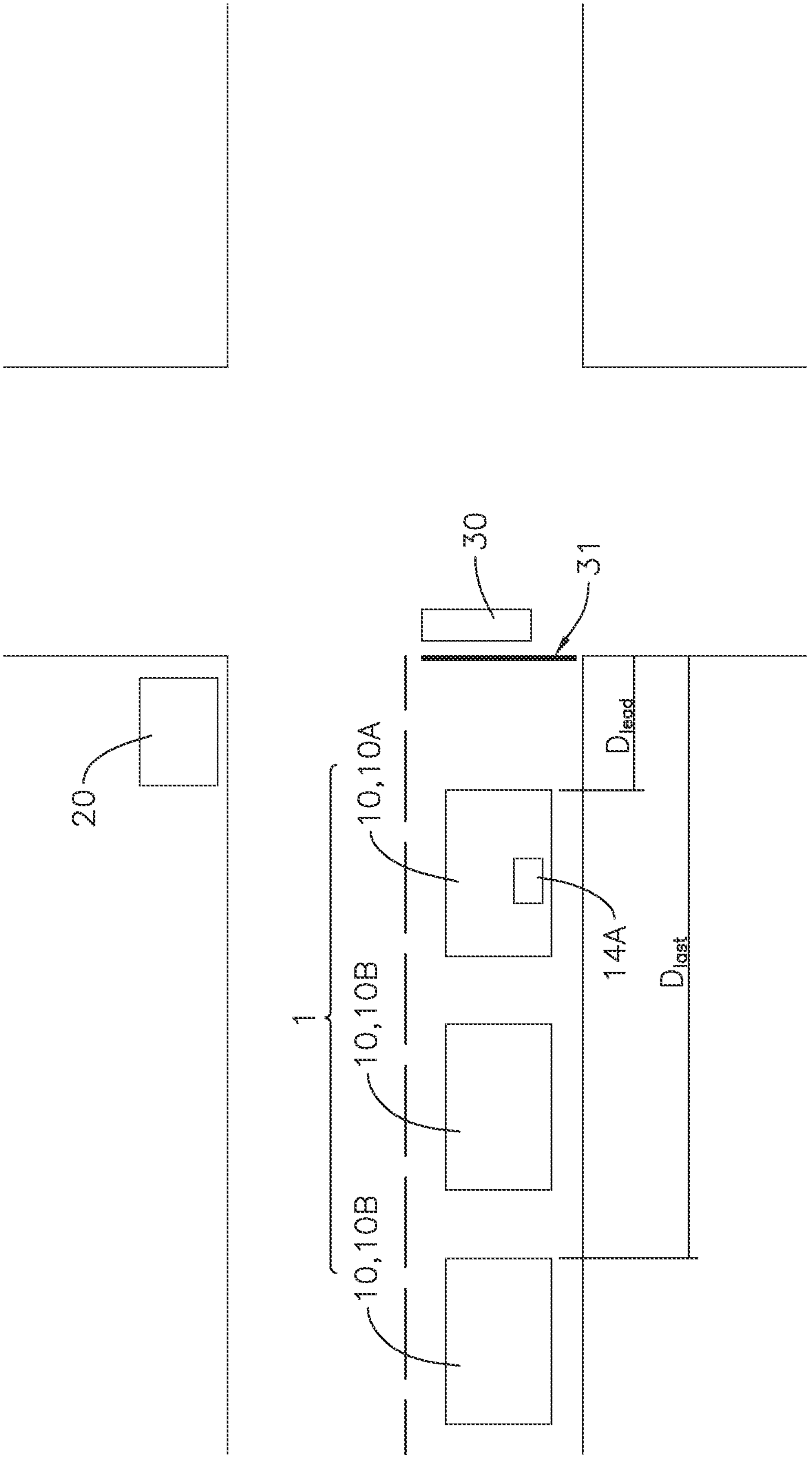
FIG. 1 is a top-down schematic view of a usage scenario of a vehicle platoon intersection decision-making system of the present invention.
Figure 2:
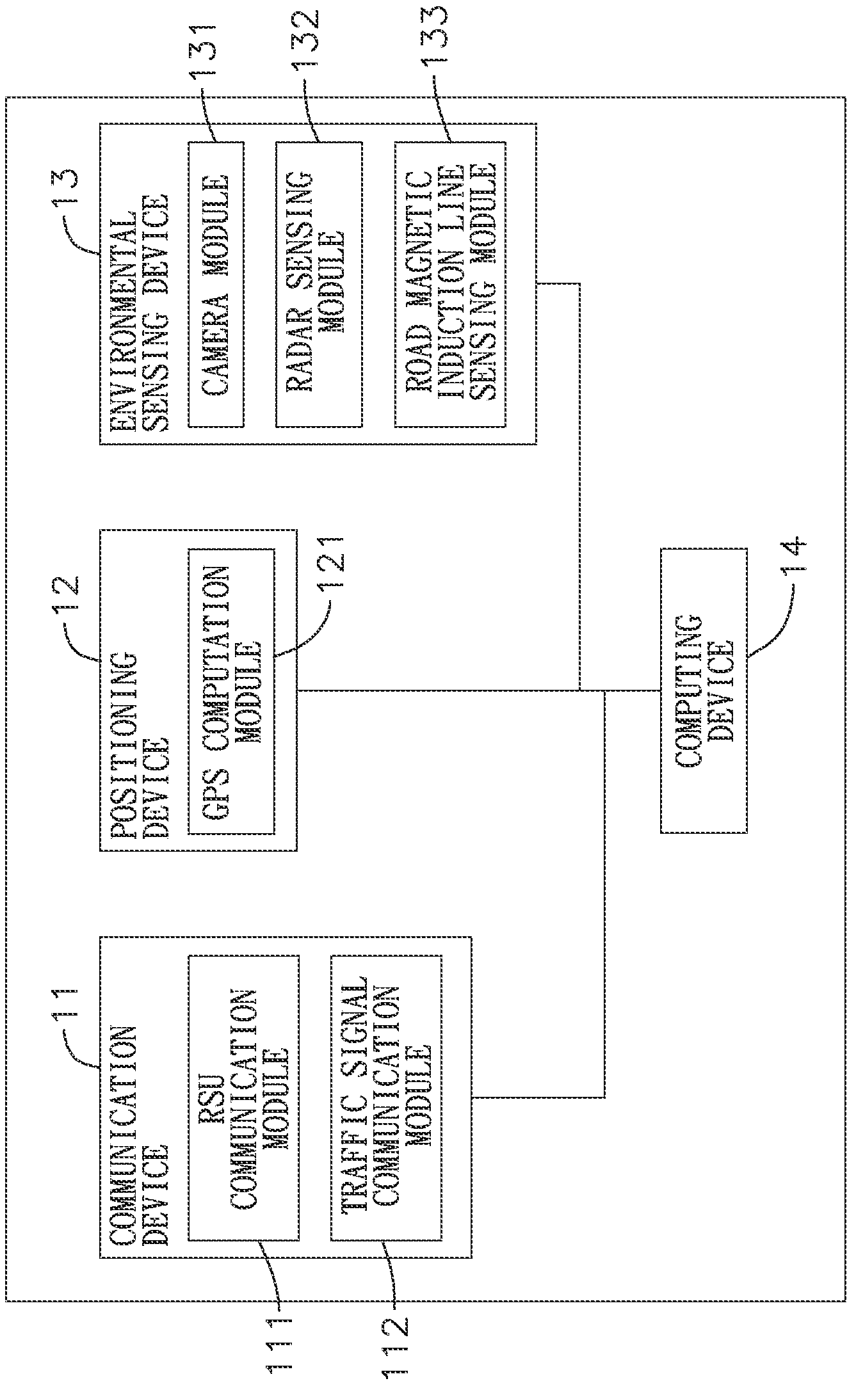
FIG. 2 is a block diagram of the devices included in a vehicle of a vehicle platoon intersection decision-making system of the present invention.

With reference to FIGS. 1 and 2, the vehicle platoon intersection decision-making system of the present invention mainly includes a vehicle platoon (hereinafter refer to as "the platoon") 1. The platoon consists of multiple vehicles 10 in a queue that travel according to a current speed command in a team-up mode.

Definitions for the terms used in this invention to denote the vehicles 10 in certain specific position is provided herein. "Leading vehicle" refers to the vehicle 10 in front and being followed by another vehicle 10; "Following vehicle" refers to the vehicle 10 behind and following another vehicle 10; "Frontmost vehicle" refers to the vehicle 10 at the very front of the platoon 1; "Rearmost vehicle" refers to the vehicle 10 at the very end of the platoon 1.

Each vehicle 10 in the platoon 1 respectively contains a communication device 11, a positioning device 12, an environmental sensing device 13, and a computing device 14. The communication device 11 of each vehicle 10 communicates with the communication device 11 of other vehicles 10, exchanging and synchronizing information with other vehicles 10, or to send/receive control signals and requests, etc., as in a C-V2V system does. The communication device 11 may further include communication modules such as a Road Side Unit (RSU) communication module 111 and a traffic signal communication module 112. The positioning device 12 is used to generate absolute position information and relative position information. Here, the absolute position information represents the absolute position of the vehicle 10 on the ground or road. The positioning device 12, for example, includes a global positioning system (GPS) computation module 121 and generates absolute position coordinates based on the global positioning system, or receives road position information of the vehicle 10 on the road from a Road Side Unit (RSU) 20 returned via the RSU communication module 111 of the communication device 11. Relative position information refers to the relative distance between the vehicle 10 and the leading vehicle or the following vehicle.

The environmental sensing device 13 includes, for example, at least one of or a combination of a camera module 131, a radar sensing module 132, and a road magnetic induction line sensing module 133, generating at least an environmental status information, such as an obstacle information or a leading vehicle identification information. Furthermore, based on the images from the camera module 131, the status of a traffic signal 30 at an intersection ahead is determined to generate intersection signal information, or the intersection distance information can be calculated, etc. The intersection distance information is calculated based on the distance between the front end of the vehicle 10 and a stop line 31 at an intersection in the images from the camera module 131, for instance. In a preferred embodiment, when the intersection is equipped with RSU 20, the environmental sensing device 13 can also receive the road status information returned by the RSU 20 to generate intersection signal information, intersection distance information, etc. Moreover, the relative position information of the positioning device 12, for example, is the result of calculations based on the returned information from the radar sensing module 132 or the camera module 131.

With reference to FIG. 1, in platoon 1, one vehicle 10 is designated as the captain vehicle 10A, and the other vehicles 10, besides the captain vehicle 10A, are defined as member vehicles 10B. The computing device 14A of the captain vehicle 10A (hereinafter referred to as captain computing device 14A) is responsible for determining the traveling strategy of the platoon 1. Besides receiving the absolute position information, relative position information, environmental status information of the captain vehicle 10A itself, the captain computing device 14A also receives, via communication devices 11, the absolute position information, relative position information, environmental status information, and any other information or requests related to the traveling strategy from member vehicles 10B, and sends control information to member vehicles 10B through the communication device 11 of the captain vehicle 10A.

Since all vehicles 10 within the platoon 1 have the ability to share information through the communication devices 11, during actual implementation, any vehicle 10 in the platoon 1 can be defined as the captain vehicle 10A and still fully realize this invention. In a preferred embodiment, it is preferable for the captain vehicle 10A to be the frontmost vehicle. For the sake of clarity, examples in this invention will be explained with the frontmost vehicle as the captain vehicle 10A.

Figure 3:
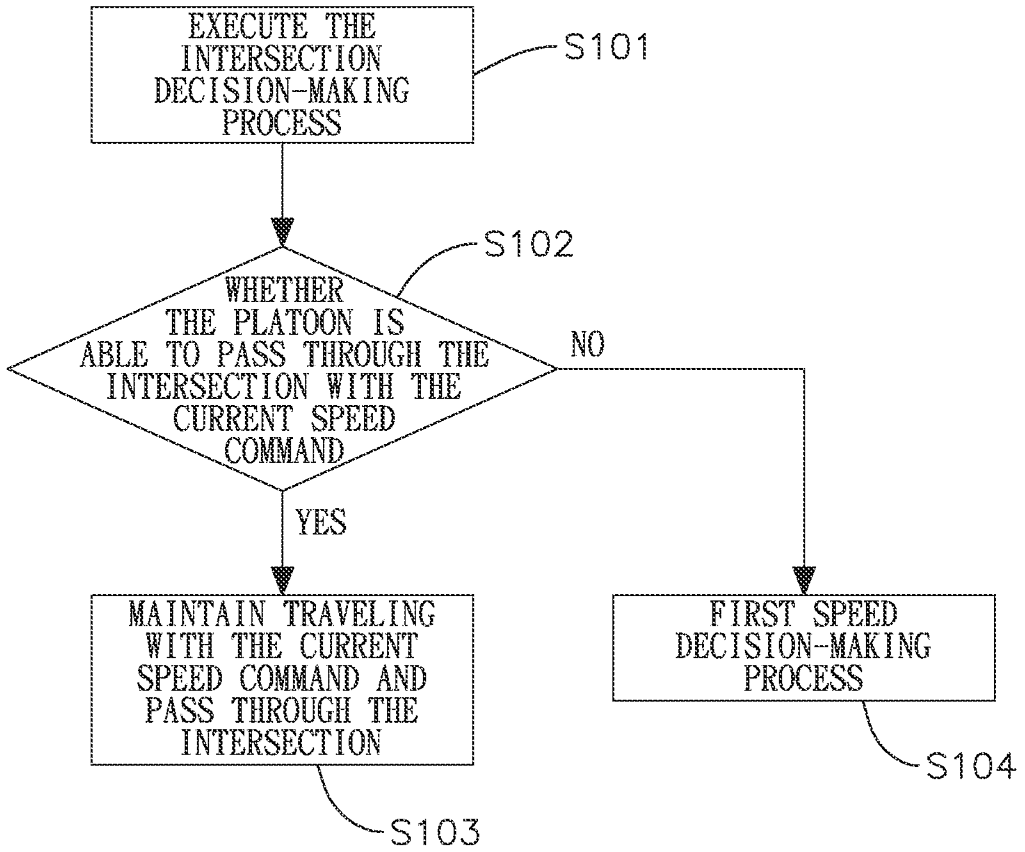
FIG. 3 is a schematic diagram of the step-by-step process of a first preferred embodiment of a vehicle platoon intersection decision-making method of the present invention.

The vehicle platoon intersection decision-making method is mainly executed by the captain vehicle 10A in the platoon of the vehicle platoon intersection decision-making system. Please also refer to the method flowchart shown in FIG. 3. In a first preferred embodiment of this invention, when the captain computing device 14A executes the intersection decision-making process (Step S101), it first determines whether the platoon 1 is able to pass through the intersection with the current speed command according to the intersection signal information and the intersection distance information, the relative position information of each vehicle 10, the absolute position information of the captain vehicle 10A, and the current speed command (Step S102). If yes, the captain computing device 14A controls the vehicles 10 to maintain traveling with the current speed command, so that the platoon 1 passes through the intersection (Step S103). If no, the captain computing device 14A generates a first optimized speed control information through a first speed decision-making process (Step S104), and sends the first optimized speed control information to each vehicle 10 through the communication device 11, so that the platoon 1 to decelerate before reaching the intersection until a critical acceleration point, and begins to accelerate, so that the platoon 1 passes through the intersection.

The judgment method for each step will be explained in detail below.

In Step S101, the captain computing device 14A decides to execute the intersection decision-making process based on specific conditions. Generally speaking, the captain computing device 14A determines whether to execute the intersection decision-making process based on whether the distance to the intersection, indicated by the intersection distance information, is less than a predefined distance threshold. The predefined distance threshold may be 100 meters.

Figure 4:
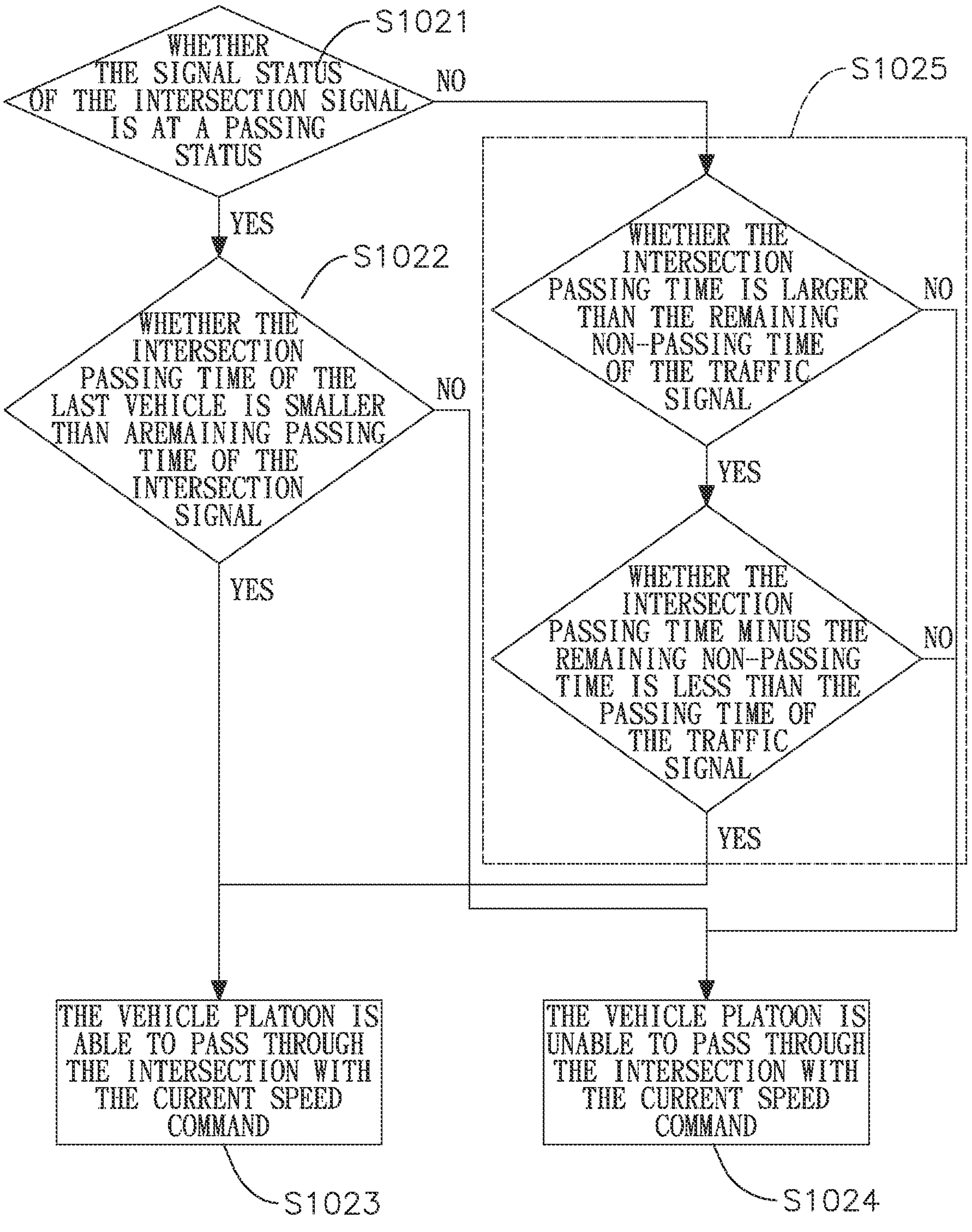
FIG. 4 is a detailed process schematic of step S102 of a vehicle platoon intersection decision-making method of the present invention.

With reference to FIG.4, in step S102, when the captain computing device 14A determines whether the platoon 1 is able to pass through the intersection with the current speed command, the captain computing device 14A first determines whether the signal status of the traffic signal 30 is at a passing status according to the intersection signal information (S1021). The passing status refers to when the traffic signal 30 is providing a green light or a yellow light, and not being at the passing status (non-passing status) refers to when the traffic signal 30 is providing a red light.

If the signal status of the traffic signal is at the passing status, which means the outcome of step S1021 is "yes", the captain computing device 14A calculates an intersection passing time of a rearmost vehicle in the vehicles 10 according to the intersection distance information, the current speed command, the relative position information of the vehicles 10, and determines whether the intersection passing time of the rearmost vehicle is smaller than a remaining passing time of the traffic signal 30 (Step S1022); if the intersection passing time of the rearmost vehicle is smaller than the remaining passing time, the platoon 1 is able to pass through the intersection with the current speed command (Step S1023); if the intersection passing time of the rearmost vehicle is not smaller than the remaining passing time, the platoon 1 is unable to pass through the intersection with the current speed command (Step S1024).

The decision of Step S1022 can be made by the following the first condition formula:

$$\frac{D_{last}}{V_{last}} \le T_G + T_Y \tag{1}$$

Together with reference To FIG. 1, wherein $D_{last}$ is the distance between the rearmost vehicle to the intersection, $V_{last}$ is the is the current speed of the rearmost vehicle, $T_G+T_y$ is the remaining passing time, where $T_G$ is the remaining second of the green light, $T_y$ is the remaining second of the yellow light.$T_G$, $T_y$ can be known from the return message of the RSU 20 or recognized from the image recognition results of the camera module 131 of the environmental sensing device 13. The invention is not limited to this.

In some preferred embodiments, the first condition formula can be optimized as follows:

$$\frac{D_{last}}{V_{last}} \le T_G + T_Y - T_{delay} \tag{1'}$$

Wherein $T_{delay}$ is an estimated communication delay time.

When $D_{last}$ and $V_{last}$ satisfy the above first condition formula (1'), it indicates that the rearmost vehicle can pass through the intersection before the passing state of the traffic signal ends; therefore, platoon 1 can maintain the current speed command to pass through the intersection.

If the traffic signal 30 is in a non-passing state, that is, step S1021 is "No," the captain processing device 14A first calculates an intersection passing time of the rearmost vehicle in the vehicles according to the intersection distance information, the current speed command, the relative position information of the vehicles 10, determines whether the intersection passing time is larger than the remaining non-passing time of the traffic signal 30, and determines whether the intersection passing time minus the remaining non-passing time is less than the passing time of the traffic signal 30 (step S1025). If both are true, it means that the platoon 1 is able to pass through the intersection with the current speed command (step S1023). Conversely, if any one of them is false, the platoon 1 is unable to pass through the intersection with the current speed command (step S1024).

The decision of Step S1025 can be made by the following second condition formula:

$$\frac{D_{last}}{V_{last}} > T_R \;\&\; \frac{D_{last}}{V_{last}} - T_R < T_G + T_Y \tag{2}$$

Wherein $T_R$ is the current remaining time of the red light, which is the remaining non-passing time of the traffic signal 30.

In some preferred embodiments, the second condition formula can be optimized as follows:

$$\frac{D_{last}}{V_{last}} > T_R \;\&\; \frac{D_{last}}{V_{last}} - T_R < T_G + T_Y + T_{delay} \tag{2'}$$

When $D_{last}$ and $V_{last}$ satisfy the above second condition formula (2'), it indicates that the rearmost vehicle can pass through the intersection after the non-passing state of the traffic signal ends, and is able to pass through the intersection before the next passing state of the traffic signal ends. Therefore, the platoon 1 is able to maintain the current speed command and passes through the intersection.

When the captain processing device 14A determines that the platoon 1 is able to pass through the intersection with the current speed command (step S1023), that is, step S102 is "Yes," the captain processing device 14A controls each vehicle 10 to continue traveling at the current speed command to pass through the intersection (step S103). On the contrary (step S1024), that is, step S102 is "No," the captain processing device 14A then enters the first speed decision process.

Figure 5:
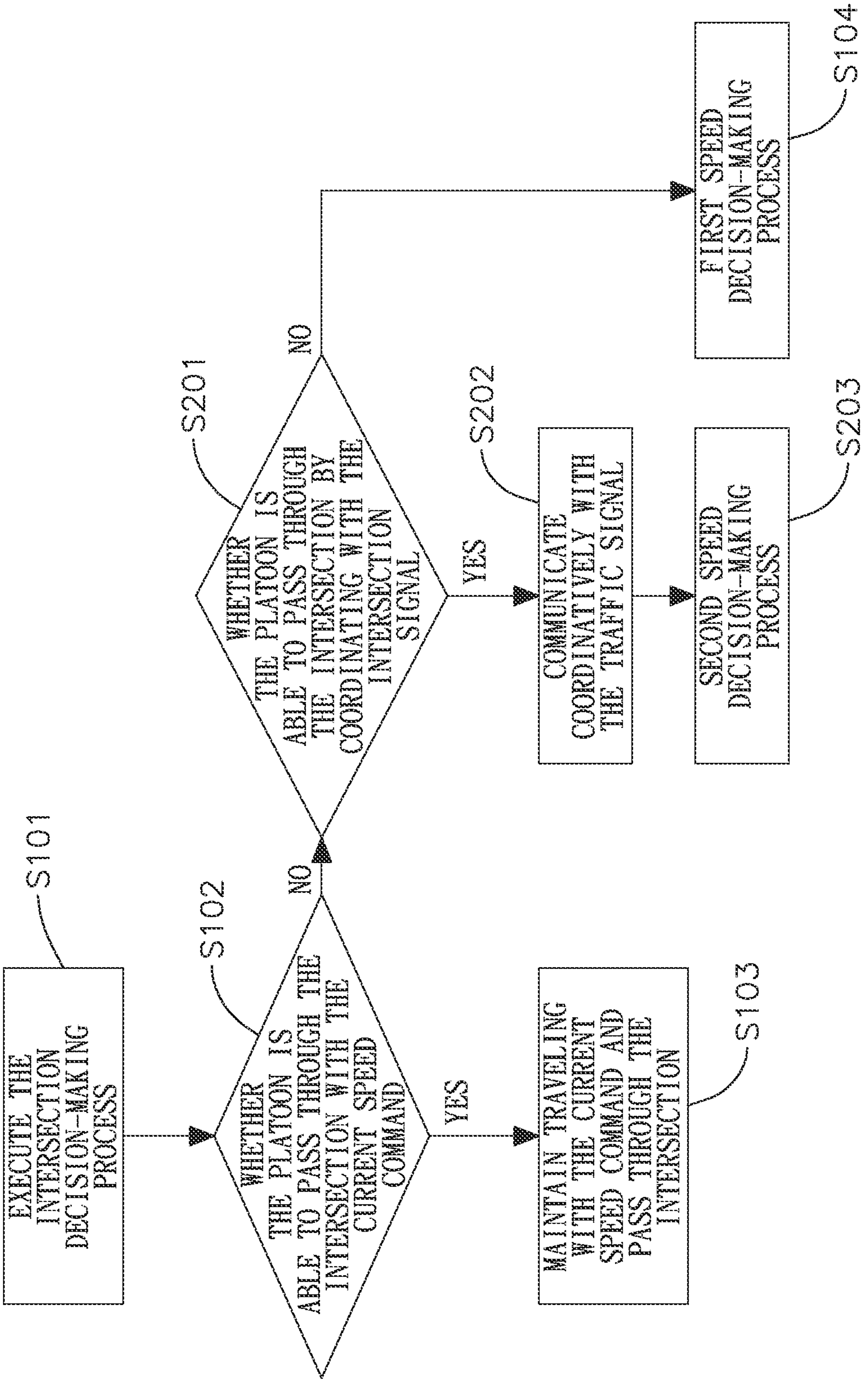
FIG. 5 is a schematic diagram of the step-by-step process of a second preferred embodiment of a vehicle platoon intersection decision-making method of the present invention.

With reference to FIG. 5, in a second embodiment, when the captain computing device 14A determines the platoon 1 is unable to pass through the intersection with the current speed command, that is, step S102 is "no", the captain computing device 14A further determines whether the platoon 1 is able to pass through the intersection by coordinating with the traffic signal according to the intersection distance information, the current speed command, the relative position information of the vehicles, and the intersection signal information (step S201). If yes, the captain computing device 14A communicates coordinatively with the traffic signal 30 so that the platoon 1 passes through the intersection; if not, the captain computing device 14A executes the first speed decision process (step S104) to generate the first optimized speed control information, and transmits the first optimized speed control information through the communication device 11 to the vehicles 10, so that the platoon 1 decelerates before reaching the intersection.

In an embodiment, when executing stepS201, the captain computing device 14A first determines if the intersection passing time of the rearmost vehicle is less than the remaining passing time of the traffic signal 30 plus a preset extending time; if yes, the platoon 1 is able to pass through the intersection by coordinating with the traffic signal 30 (Step S201 is "yes").

When the captain processing device 14A communicates coordinatively with the traffic signal 30 (step S202), it is actually requesting that the remaining passing time of the traffic signal 30 be extended by a predetermined extension time (step S202'). If not, it is judged that the platoon 1 is unable to pass through the intersection by coordinating with the traffic signal 30 (step S201 is "No"); therefore, it executes the first speed decision process (step S104).

The following will further explain the first speed decision process and the second speed decision process.

Summarizing the above explanation, the precondition for entering the first speed decision process (step S104) is that the platoon 1 is unable to pass through the intersection at the current speed. Under this circumstance, the goal of the first speed decision process is to decelerate the platoon 1 to a coasting speed and start accelerating at an acceleration critical time point so that the platoon 1 can pass through the intersection when the traffic signal changes from a non-passing state to a passing state.

Figure 6:
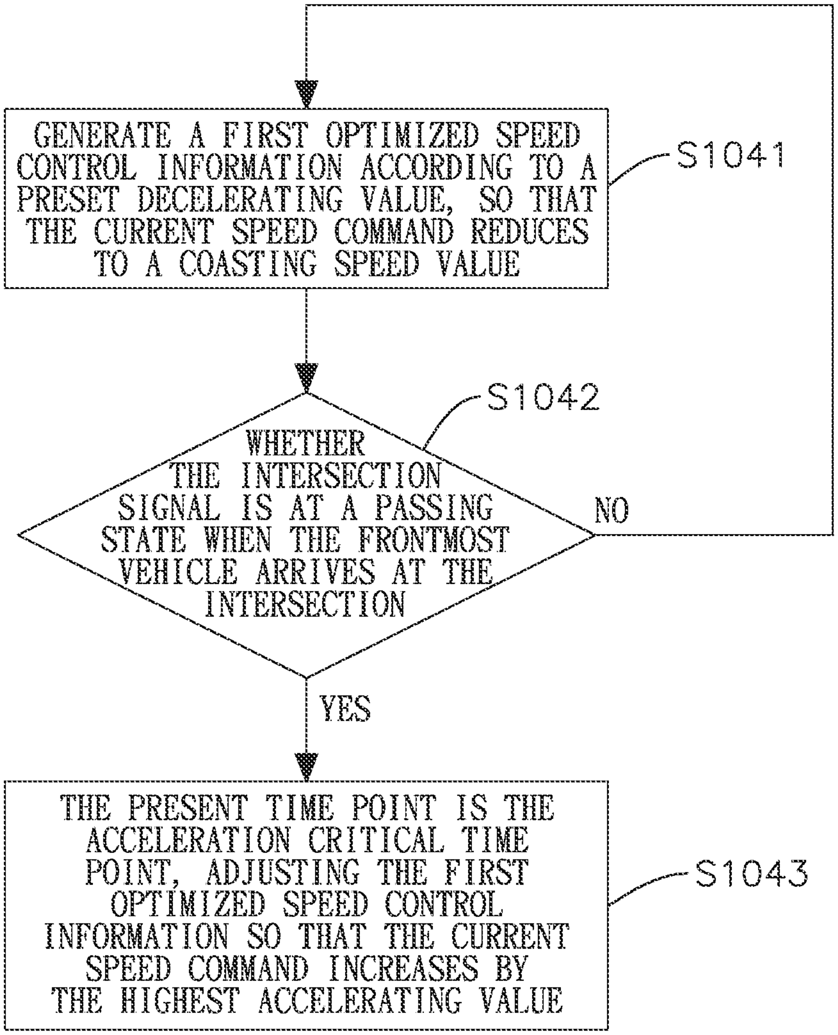
FIG. 6 is a schematic diagram of the step-by-step process for the first speed decision procedure of a vehicle platoon intersection decision-making method of the present invention.

With reference to FIG. 6, the first speed decision process (Step S104) includes:

generating a first optimized speed control information according to a preset decelerating value, so that the current speed command reduces to a coasting speed value (Step S1041);

continuously calculating an arrival time to the intersection according to a highest accelerating value, the current speed command, and the intersection distance information, and determining whether the traffic signal 30 is at a passing state when a frontmost vehicle of the platoon 1 arrives at the intersection according to the arrival time (Step S1042); if yes, determining the present time point to be the acceleration critical time point, adjusting the first optimized speed control information so that the current speed command increases by the highest accelerating value (Step S1043), until the platoon 1 passes the intersection after the traffic signal 30 turns to the passing state from the non-passing state.

Calculating whether the traffic signal 30 is at the passing state when the frontmost vehicle arrives at the intersection accelerating at the maximum acceleration value, for example, is determined based on the following equation:

$$D_{lead} = V_{lead0}T_{allow} + \frac{1}{2}a_{max}T_{allow}^2$$

$$T_{allow} = \frac{-V_{lead0} \pm \sqrt{V_{lead0}^2 + 2a_{max}D_{lead}}}{a_{max}}$$

Wherein $D_{lead}$ is the distance from the frontmost vehicle to the intersection, $a_{max}$ is the maximum acceleration value preset by the system, $T_{allow}$ is the time required for the frontmost vehicle to pass through the intersection with the e maximum acceleration value, and $V_{lead0}$ is the current speed of the frontmost vehicle. $T_{allow} \in T_G$ indicates that based on the currently calculated time for the lead vehicle to pass through the intersection, the traffic signal 30 is at the passing state when the lead vehicle arrives at the intersection.

The precondition for entering the second speed decision process (step S203) is: the platoon 1 is not able to pass through the intersection at the current speed, and the captain processing device 14A is able to make the platoon 1 pass through the intersection by coordinating with traffic signal 30. More explicitly, the captain processing device 14A is able to make the rearmost vehicle of the platoon 1 pass through the intersection within the time after the remaining passing time plus the predetermined extension time by requesting the traffic signal 30 to extend the predetermined extension time.

Preferably, the second speed decision process (step S203) generates the second optimized speed control information based on a maximum speed value and the corresponding maximum acceleration value; the second optimized speed control information gradually increases the current speed command to the maximum speed value. In this way, the second speed decision process enables platoon 1 to accelerate through the intersection to ensure that platoon 1 passes through the intersection within the time after the remaining passing time plus the preset extending time.

Figure 7:
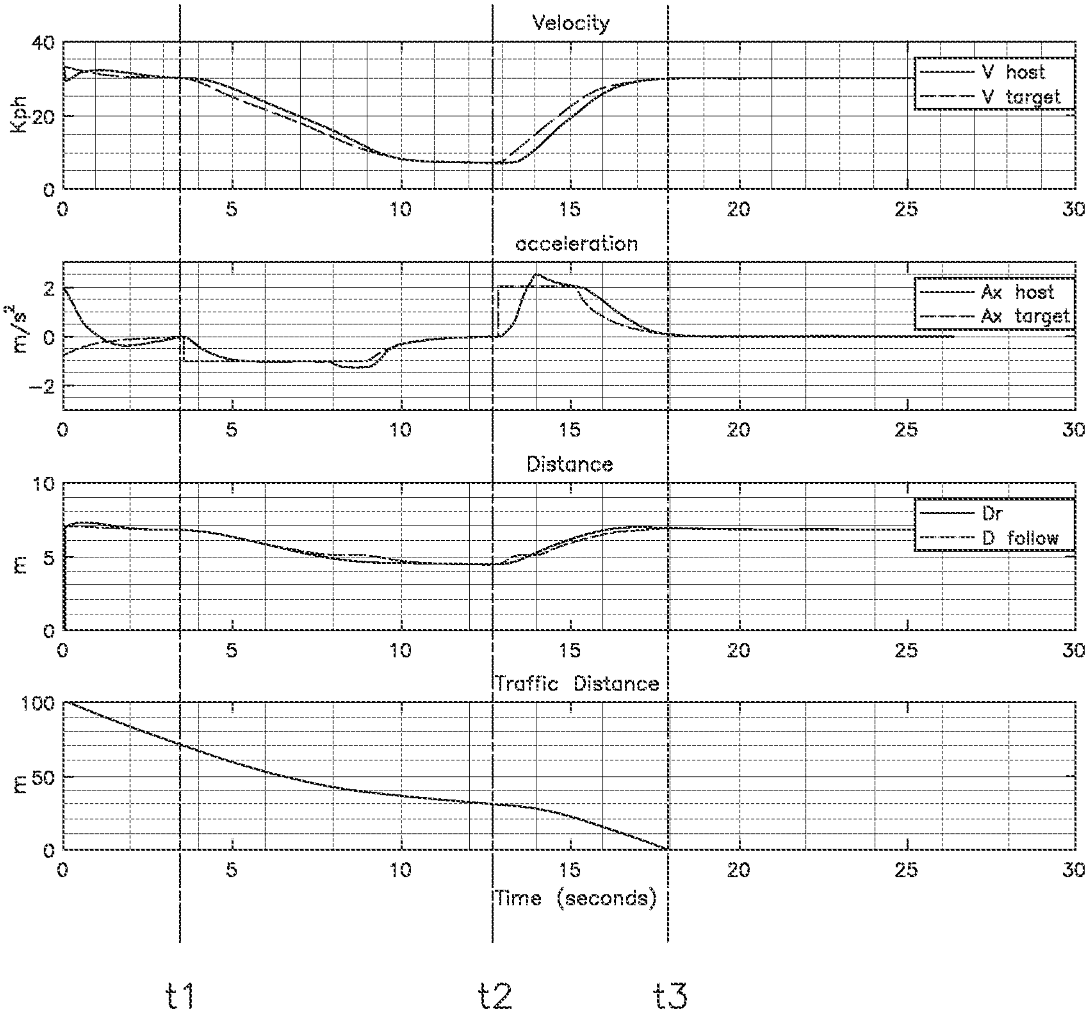
FIG. 7 is a chart showing the experimental validation results for the first speed decision procedure of a vehicle platoon intersection decision-making method of the present invention.
Figure 8:
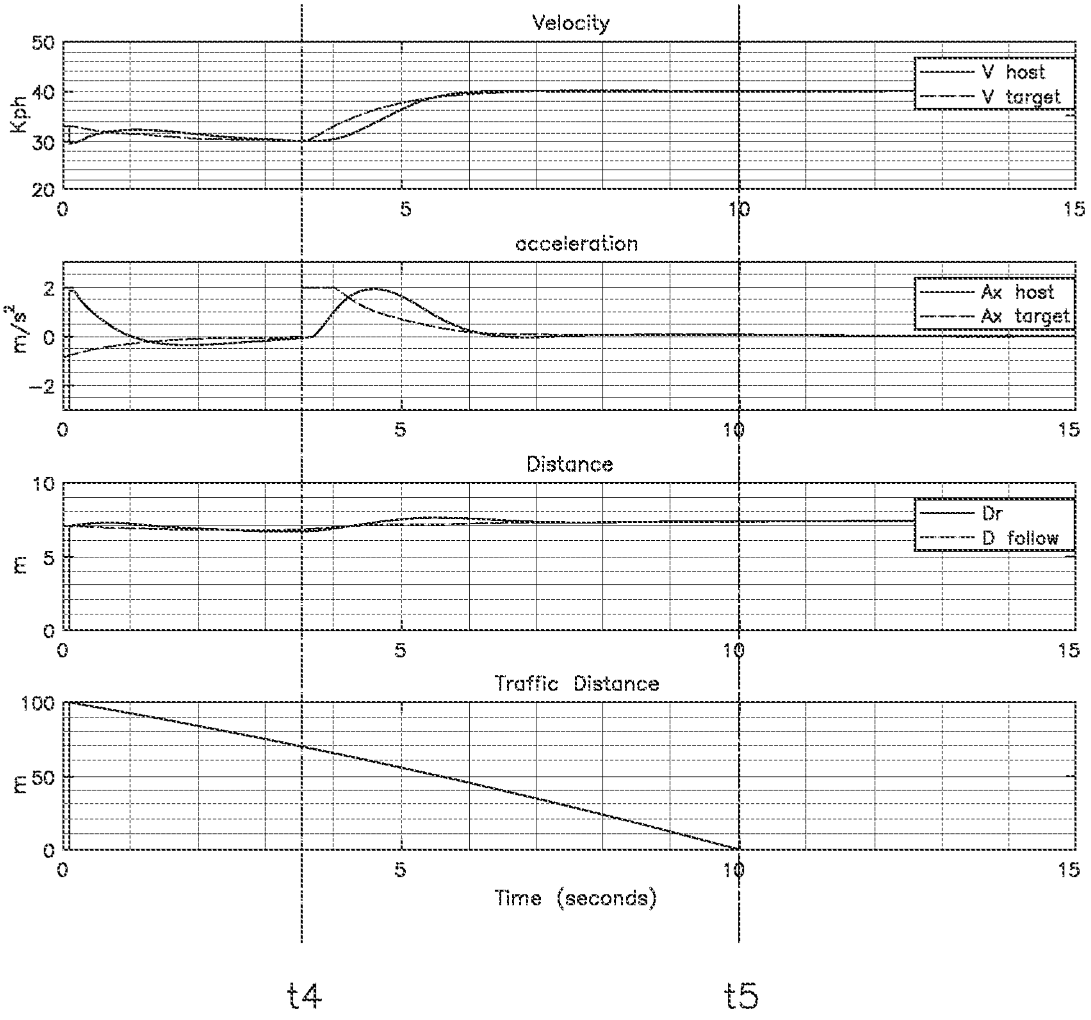
FIG. 8 is a chart showing the experimental validation results for the second speed decision procedure of a vehicle platoon intersection decision-making method of the present invention.

FIGS. 7 and 8 respectively show the experimental verification results of the first speed decision process and the second speed decision process. Among them, the four charts from top to bottom respectively represent the platoon speed (Velocity) (Kph), platoon acceleration (Acceleration) ($m/s^2$), platoon length (Distance) (m), and distance to the intersection (Traffic Distance) (m). In the platoon speed chart, there are two waveforms: target speed (V target) and actual speed (V host); in the platoon acceleration chart, there are two waveforms: target acceleration (Ax target) and actual acceleration (Ax host); in the platoon length chart, there are two waveforms: actual length (Dr) and target length (D follow).

It can be noticed that, the target speed and actual speed, target length and actual length roughly match, while the response of the actual acceleration lags slightly behind the target acceleration.

With reference to FIG. 7, when executing the first speed decision process, at time point t1, the captain processing device 14A determines that platoon 1 is unable to pass through the intersection with the current speed command. Therefore, the target acceleration is set to a preset deceleration value, i.e., the first optimized speed control information is generated with the preset deceleration value, causing the platoon 1 to start decelerating to a coasting speed and then glide at roughly a constant speed; at time point t2, the captain processing device 14A determines it is the acceleration critical time point, so the target acceleration is set to the maximum acceleration value, i.e., the first optimized speed control information is adjusted with the maximum acceleration value, causing the platoon 1 to start accelerating until at time point t3, the platoon 1 arrives at and passes through the intersection. Wherein this time point at which the distance to the intersection is 0 m.

With reference to FIG. 8, when executing the second speed decision process, at time point t4, the captain processing device 14A determines that the platoon 1 is able to pass through the intersection after the traffic signal 30 extends the preset extending time. Therefore, the second optimized speed control information is generated based on the maximum acceleration value, allowing the platoon 1 to start accelerating, until at time point t5, the platoon 1 arrives at and passes through the intersection.

In summary, the vehicle platoon intersection decision system of this invention enables the platoon 1 to actively enter the intersection decision process, determining the most effective speed control information based on the signal status of the traffic lights, the distance between the platoon 1 and the intersection, the length of the platoon 1, and the current speed of platoon 1. No matter whether the platoon 1 is able to pass directly through the intersection, able to pass through the intersection by extending the signal status time, or must slow down and is unable to pass directly through the intersection, the platoon 1 can optimally execute the task of passing through the intersection without reducing the speed of the platoon to 0. This allows the platoon 1 to pass through the intersection smoothly and effectively improves energy efficiency.

Figure 9:
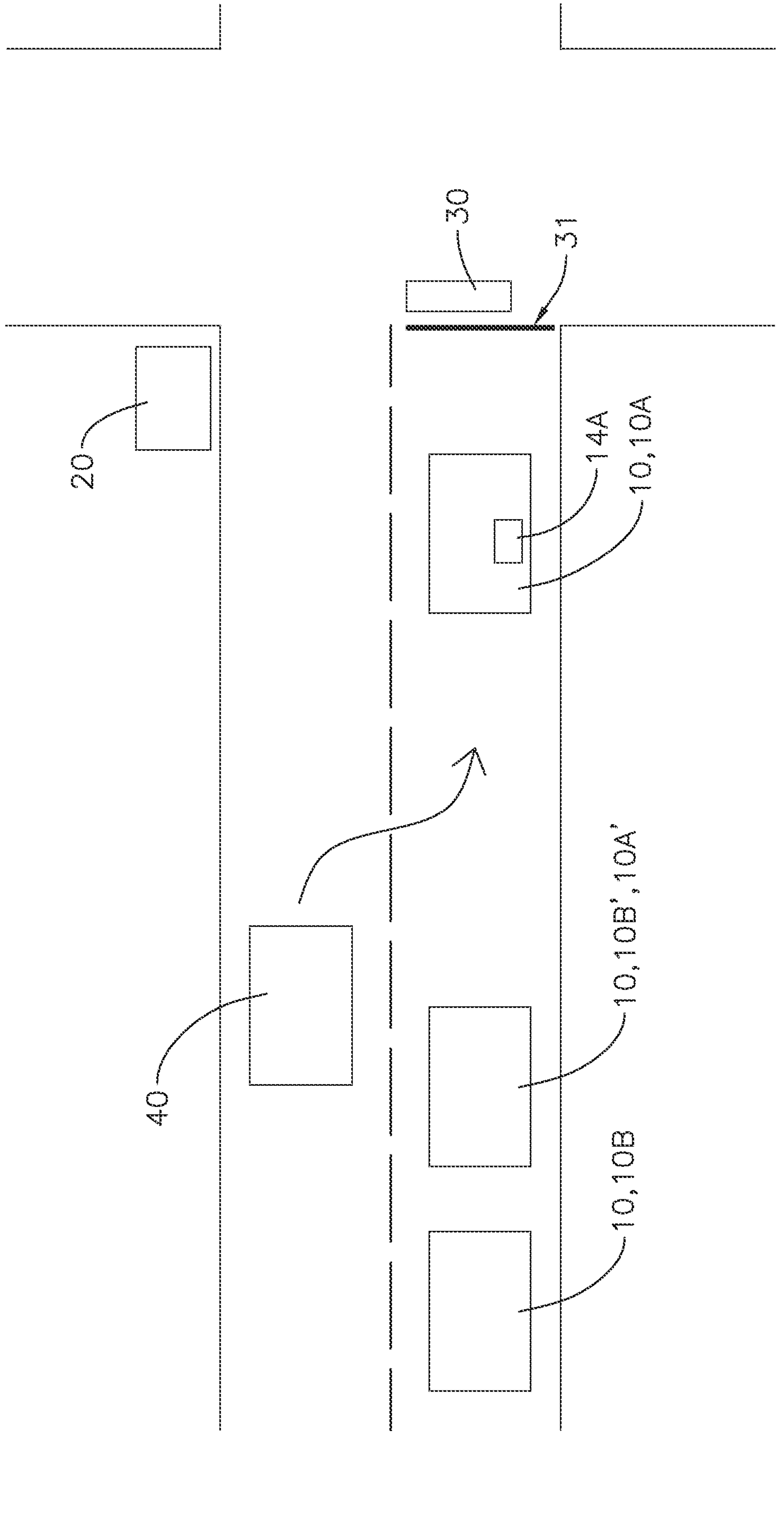
FIG. 9 is a schematic view of an application scenario of a third preferred embodiment of the vehicle platoon intersection decision-making system of the present invention.

As illustrated in FIG. 9, in a third embodiment, a special condition in which the platoon 1 is cut in by an external vehicle 40 is further considered. When the platoon 1 is in a normal platooning formation, the vehicles 10 in the platoon 1 follow one another closely, with no non-platoon vehicles (hereinafter referred to as "external vehicles") 40 in between. When an external vehicle 40 cuts in between two vehicles 10 in the platoon 1 from another lane, an external vehicle 40 cut-in situation occurs.

Figure 10:
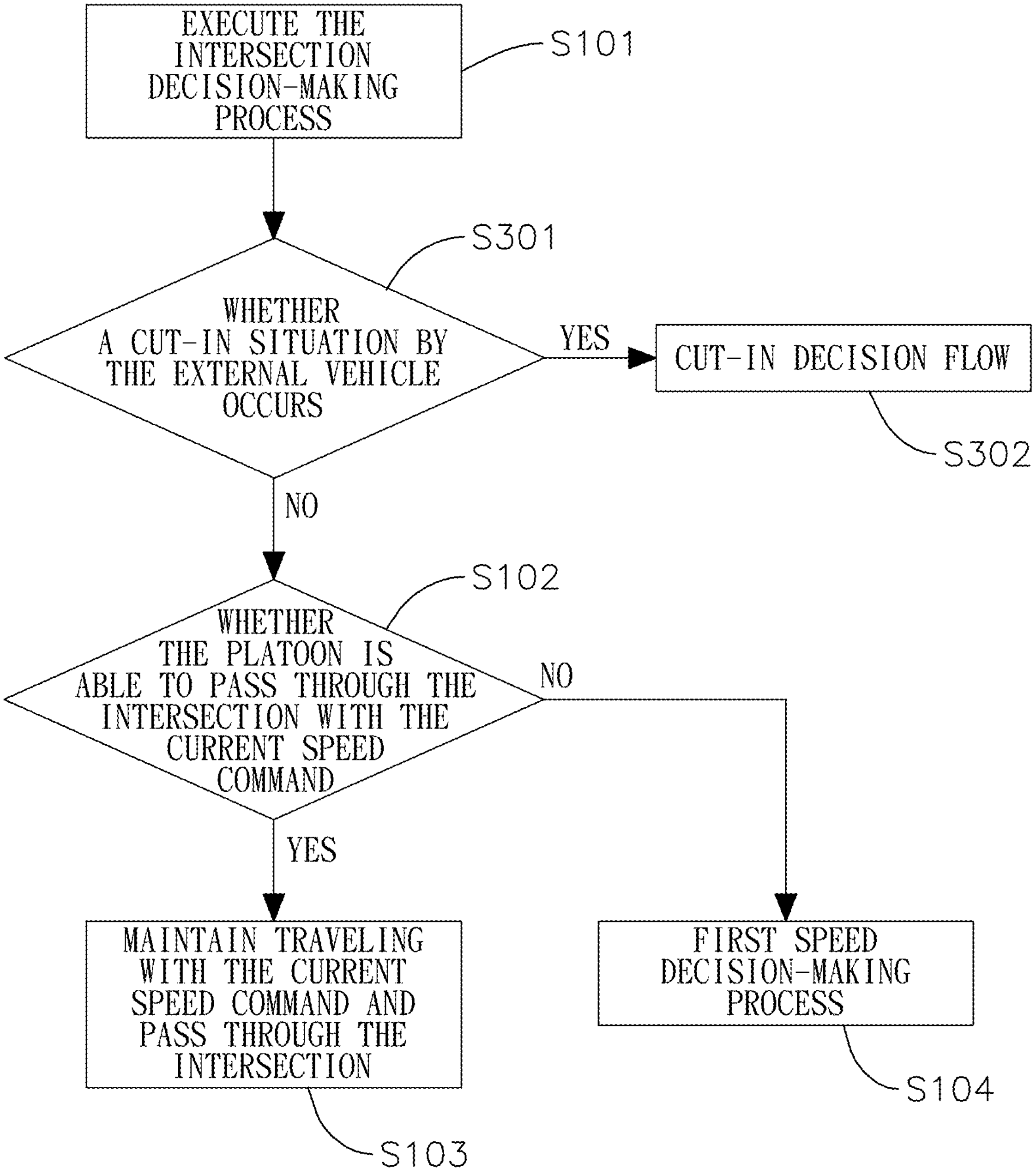
FIG. 10 is a schematic diagram of a step-by-step process of a third preferred embodiment of a vehicle platoon intersection decision-making method of the present invention.

The vehicle platoon intersection decision-making method further includes the following steps executed by any one of the member vehicles 10B.With reference to FIG. 10, in practice, for example, through the camera module 131 of the environmental sensing device 13 or in combination with the radar sensing module 132's sensing information in any member vehicle 10B, the computing device 14 of the member vehicle 10B continuously determines whether there is an external vehicle 40 cutting into a preset range of the target driving lane, and determines whether a cut-in situation by the external vehicle 40 occurs (step S301). If yes, it is determined that the cut-in situation has occurred, and the process enters the cut-in decision flow (step S302); if not, the captain computing device 14A then determines whether the platoon 1 is able to pass through the intersection with the current speed command as described in the foregoing Step S102. The actual judgment of the external vehicle 40 cutting into the preset range of the target driving lane, for example, is when the nearside tire of the original external vehicle 40 in the adjacent lane cuts into the target driving lane by 30 cm. The cut-in decision flow (step S302) includes the following sub-steps.

Figure 11:
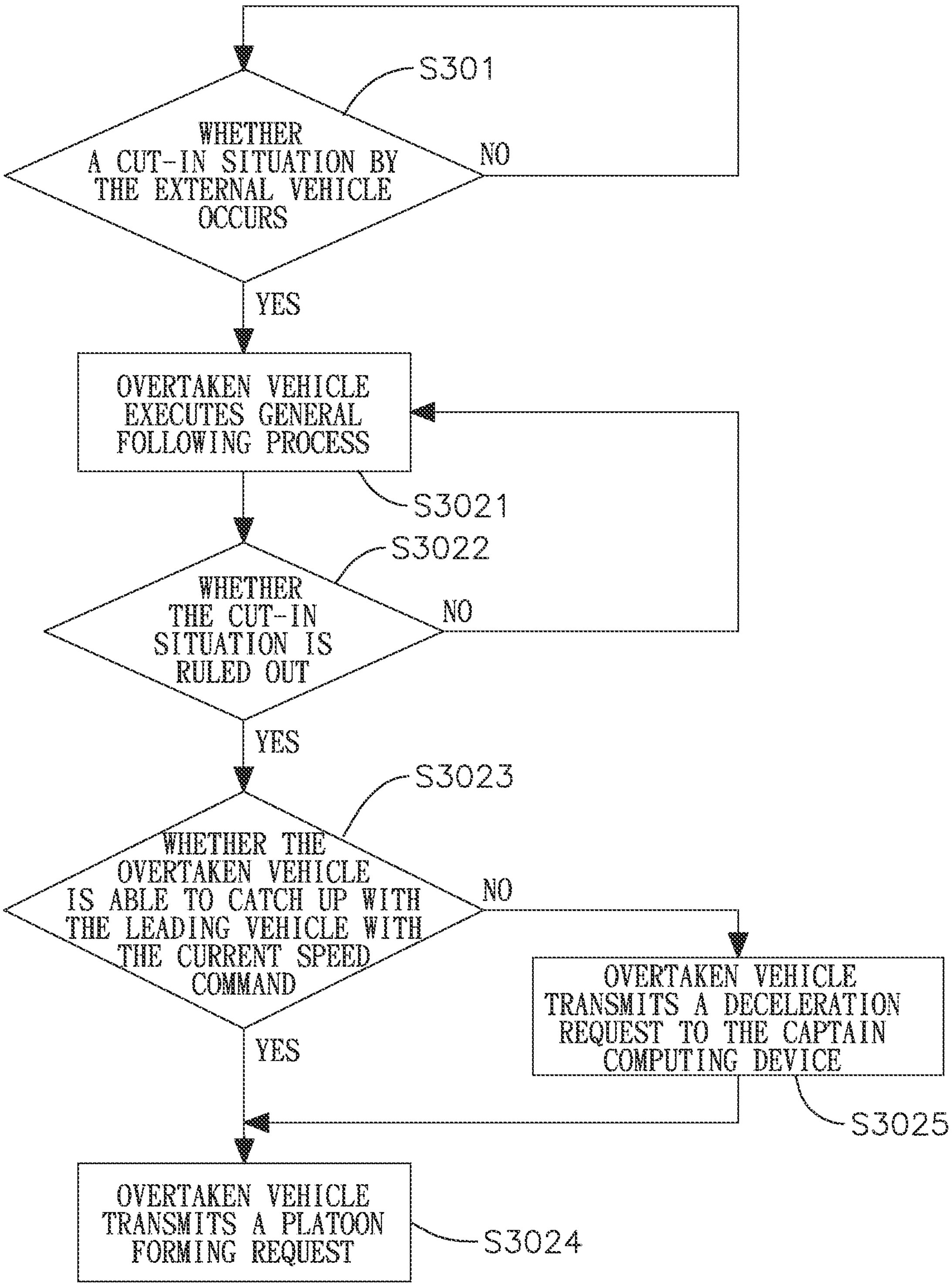
FIG. 11 is a detailed process schematic of step S302 in a third preferred embodiment of a vehicle platoon intersection decision-making method of the present invention.

With reference to FIG. 11, when the cut-in situation occurs, the member vehicle 10B that is intervened by the external vehicle (hereinafter referred to as 'the overtaken vehicle 10B') sends a cut-in notification to the other vehicles 10 in the platoon 1 through the communication device 11, to inform the captain vehicle 10A and other member vehicles 10B about the cut-in situation, and a general following process is executed (step S3021). The general following process refers to the overtaken vehicle 10B' continuing to follow the external vehicle 40. The overtaken vehicle 10B' will continuously determine whether the cut-in situation is ruled out (step S3022). For example, based on the environment sensing device 13 of the overtaken vehicle 10B', the overtaken vehicle 10B' continuously determines whether the external vehicle 40 has completely left the target driving lane, indicating that the cut-in situation has been ruled out.

When the cut-in situation is ruled out, the computing device 14 of the overtaken vehicle 10B' determines whether the overtaken vehicle 10B' is able to catch up with a leading vehicle of the vehicles with the current speed command (S3023); if the overtaken vehicle 10B' is able to catch up with the leading vehicle with the current speed command, the computing device 14 of the overtaken vehicle 10B transmits a platoon forming request (S3024) to the captain computing device 114A through the communication device 11 and executes a platoon forming process; if the overtaken vehicle 10B is unable to catch up with the leading vehicle with the current speed command, the computing device 14 of the overtaken vehicle 10B' transmits a deceleration request to the captain computing device 14A through the communication device 11 (S3025), to request the captain vehicle 10A to travel with deceleration, and then executes the platoon forming process (S3024).

When the overtaken vehicle 10B' determines whether it can catch up with the leading vehicle at the current speed command, it calculates a time gap minus the values of the distance between the overtaken vehicle 10B' and the leading vehicle divided by a maximum speed value, and determines if the outcome is less than a predetermined time. If it is less than the predetermined time, it indicates that the overtaken vehicle 10B' is able to catch up with the leading vehicle, and the platoon forming request can be directly conducted. If it is larger than the predetermined time, it indicates that the overtaken vehicle 10B' is unable to catch up with the leading vehicle. This "time gap" refers to a ratio of the current speed and the relative distance of vehicles while in platoon movement. It is calculated based on the current speed, with the formula being the relative distance between the following vehicle and the leading vehicle divided by the current speed. For example, according to ISO15622, when the current speed is more than 8 meters/second, this time gap should be between 1.5 and 2.2 seconds. Additionally, the predetermined time is, for example, 1 second.

It should be noted that after the occurrence of the cut-in situation, regardless of whether there is other member vehicles 10B behind the overtaken vehicle 10B', the overtaken vehicle 10B' is defined as a temporary captain vehicle 10A'. During the execution of the general following process and the determination of the rule out of the cut-in situation, the temporary captain vehicle 10A' generates and sends speed control information to other member vehicles 10B behind it based on the general following process. It also executes all the decision processes that should be performed by the captain vehicle 10A in this invention until the cut-in situation is resolved, and the platoon forming process with the front vehicle/captain vehicle 10A is completed. Only then does the temporary captain vehicle 10A' resume its identity as a member vehicle 10B. The mentioned "general following process" refers to the following decision process executed when the vehicle 10 is traveling in the same lane and following the external vehicle 40. The main goal is to maintain an appropriate traveling distance with the external vehicle 40 until the external vehicle 40 leaves the target driving lane of the platoon 1.

The platoon forming process includes multiple steps, involving but not limited to, initiating the platoon forming function by the captain vehicle 10A and the overtaken vehicle 10B', determining whether the captain vehicle 10A and the overtaken vehicle 10B' are in the same target driving lane, determining whether the communication delay between the captain vehicle 10A and the overtaken vehicle 10B' is below a communication delay threshold (for example: 150 ms), determining whether there are no obstacles (external vehicle 40 or other obstacles) between the overtaken vehicle 10B' and the leading vehicle, and determining whether the time gap minus the set cruise following time difference is less than a predetermined time (for example: 0.3 seconds). Here, when the time gap minus the set cruise following time difference is less than the predetermined time, it indicates that the current difference between the time gap and the set cruise following time difference is less than this predetermined time, thus meeting the conditions for platoon formatting.

In summary, the second preferred embodiment of this invention further provides a complete decision process when, after entering the intersection decision process, any member vehicle 10B is cut in from the front by an external vehicle 40. As previously mentioned, since every vehicle 10 in the platoon is equipped with the communication device 11, the positioning device 12, the environment sensing device 13, and the computing device 14 with the same capabilities, when the external vehicle 40 cuts in and the platoon is divided apart, the overtaken vehicle 10B' can also temporarily execute the functions of the captain vehicle 10A and continue the driving tasks. After the cut-in situation is resolved, the overtaken vehicle 10B' resumes the original platoon mode traveling in accordance with the standard process and forms the platoon with the leading vehicle/captain vehicle 10A.

What is claimed is:

1. A vehicle platoon intersection decision-making system, comprising:

a vehicle platoon, comprising multiple vehicles arranged in order, the vehicles including a captain vehicle and multiple member vehicles traveling according to a current speed command; each vehicle respectively comprising:

a communication device; wherein the communication devices of the vehicles are communicatively connected to each other;

a positioning device, generating an absolute position information and a relative position information;

an environment sensing device, generating an environment status information;

a computing device, connected to the communication device to communicate with the other vehicles, connected to the positioning device to receive the absolute position information and the relative position information, and connected to the environment sensing device to receive the environment status information; wherein the computing device of the captain vehicle is defined as a captain computing device, the captain computing device executes an intersection decision-making process, determining whether the vehicle platoon is able to pass through an intersection with the current speed command according to an intersection signal information and an intersection distance information in the environment status information, the relative position information of each vehicle, the absolute position information of the captain vehicle, and the current speed command;

if yes, the captain computing device controls the vehicles to maintain traveling with the current speed command, so that the vehicle platoon passes through the intersection; and if no, the captain computing device generates a first optimized speed control information through a first speed decision process, transmits the first optimized speed control information to the other vehicles through the communication device, controlling the vehicle platoon to decelerate before reaching the intersection until an acceleration critical time point, and begins to accelerate, so that the vehicle platoon passes through the intersection;

wherein when the captain computing device determines that the vehicle platoon is unable to pass through the intersection with the current speed command, the captain computing device further determines whether the vehicle platoon is able to pass through the intersection by coordinating with a traffic signal according to the intersection distance information, the current speed command, the relative position information of the vehicles, and the intersection signal information; if yes, the captain computing device performs a coordinate communication with the traffic signal, and generates a second optimized speed control information through a second speed decision process, so that the vehicle platoon passes through the intersection; and if not, the captain computing device then generates a first optimized speed control information, and transmits the first optimized speed control information to the other vehicles through the communication device, controlling the vehicle platoon to travel with deceleration before reaching the intersection;

wherein when the captain computing device determines whether the vehicle platoon is able to pass through the intersection by coordinating with the traffic signal, the captain computing device calculates an intersection passing time of a rearmost vehicle according to the intersection distance information, the current speed command, the relative position information of the vehicles, and determines whether the intersection passing time of the rearmost vehicle is smaller than a sum of a remaining passing time of the traffic signal and a preset extending time; if yes, the vehicle platoon is able to pass through the intersection by coordinating with the traffic signal; when the captain computing device performs a coordinate communication with the traffic signal, the captain device transmits a request to the traffic signal to extend the remaining passing time by the preset extending time; and if not, the vehicle platoon is unable to pass through the intersection by coordinating with the traffic signal;

wherein when the captain computing device executes the intersection decision-making process, the computing devices of the vehicles determine whether a cut-in situation by an external vehicle occurs;

if yes, an overtaken vehicle in the vehicle platoon executes a general following mode, and continuously determines whether the cut-in situation is ruled out;

when the cut-in situation is ruled out, the computing device of the overtaken vehicle determines whether the overtaken vehicle is able to catch up with a leading vehicle of the vehicles with the current speed command;

if the overtaken vehicle is able to catch up with the leading vehicle with the current speed command, the computing device of the overtaken vehicle transmits a platoon forming request to the captain computing device through the communication device and executes a platoon forming process;

if the overtaken vehicle is unable to catch up with the leading vehicle with the current speed command, the computing device of the overtaken vehicle transmits a deceleration request to the captain computing device through the communication device to request the captain vehicle to travel with deceleration, and then executes the platoon forming process.

2. The vehicle platoon intersection decision-making system as claimed in claim 1, wherein when the captain computing device determines whether the vehicle platoon is able to pass through the intersection with the current speed command, the captain computing device first determines whether the signal status of the traffic signal is at a passing status according to the intersection signal information;

if the signal status of the traffic signal is at the passing status, the captain computing device calculates the intersection passing time of the rearmost vehicle in the vehicles according to the intersection distance information, the current speed command, the relative position information of the vehicles, and determines whether the intersection passing time of the rearmost vehicle is smaller than the remaining passing time of the traffic signal;

if the intersection passing time of the rearmost vehicle is smaller than the remaining passing time, the vehicle platoon is able to pass through the intersection with the current speed command;

if the intersection passing time of the rearmost vehicle is not smaller than the remaining passing time, the vehicle platoon is unable to pass through the intersection with the current speed command;

if the signal status of the-traffic signal is at a non-passing status, the captain computing device first calculates the intersection passing time of the rearmost vehicle in the vehicles according to the intersection distance information, the current speed command, the relative position information of the vehicles, determines whether the intersection passing time of the rearmost vehicle is larger than a remaining non-passing time of the traffic signal; and determines whether the intersection passing time of the rearmost vehicle minus the remaining non-passing time is smaller than a passing time of the traffic signal; and if both are true, the vehicle platoon is able to pass through the intersection with the current speed command.

3. The vehicle platoon intersection decision-making system as claimed in claim 1, wherein when the captain computing device executes the intersection decision-making process, the computing devices of the vehicles determine whether a cut-in situation by an external vehicle occurs;

if not, the captain computing device then determines whether the vehicle platoon is able to pass through the intersection with the current speed command.

4. The vehicle platoon intersection decision-making system as claimed in claim 1, wherein the first speed decision process includes:

generating a first optimized speed control information according to a preset decelerating value, so that the current speed command reduces to a coasting speed value;

continuously calculating an arrival time at the intersection according to a highest accelerating value, the current speed command, and the intersection distance information, and determining whether the traffic signal is at a passing state when a frontmost vehicle of the vehicle platoon arrives at the intersection according to the arrival time;

if yes, determining the present time point to be an acceleration critical time point, adjusting the first optimized speed control information so that the current speed command increases by the highest accelerating value, so that the vehicle platoon passes through the intersection when the traffic signal turns to the passing state from the non-passing state;

if not, maintaining the first optimized speed control information according to the coasting speed value.

5. The vehicle platoon intersection decision-making system as claimed in claim 1, wherein the second speed decision process includes:

generating a second optimized speed control information according to an upper speed limit value and an upper acceleration limit value so that the current speed command increases to the upper speed limit value gradually.

6. The vehicle platoon intersection decision-making system as claimed in claim 1, wherein the communication device includes a roadside device communication module;

the environment sensing device includes at least one of a camera module, a radar sensing module or a combination thereof;

the positioning device generates the absolute position information according to a road position information received from the roadside device communication module, and generates the relative position information according to the information received from the environment sensing device.

7. A vehicle platoon intersection decision-making method, implemented with a computing device of a captain vehicle in a vehicle platoon, comprising the following steps:

executing an intersection decision-making process;

determining whether the vehicle platoon is able to pass an intersection with a current speed command according to an intersection signal information and an intersection distance information in an environment sensing information, a relative position information of vehicles in the vehicle platoon, an absolute position information of the captain vehicle, and the current speed command;

if yes, controlling the vehicles to maintain traveling with the current speed command, so that the vehicle platoon passes through the intersection; and if not, generating a first optimized speed control information through a first speed decision process, transmitting the first optimized speed control information to the other vehicles, controlling the vehicle platoon to travel with deceleration before reaching the intersection until an acceleration critical time point, and starting travelling with acceleration, so that the vehicle platoon passes through the intersection;

wherein when "the vehicle platoon is unable to pass through the intersection with the current speed command" is determined, the method further includes: determining whether the vehicle platoon is able to pass through the intersection by coordinating with a traffic signal according to the intersection distance information, the current speed command, the relative position information of the vehicles, and the intersection signal information; if yes, performing a coordinate communication with the traffic signal, and generating a second optimized speed control information through a second speed decision process, so that the vehicle platoon passes through the intersection; if not, generating the first optimized speed control information, and transmitting the first optimized speed control information to the other vehicles through the communication device, controlling the vehicle platoon to travel with deceleration before reaching the intersection;

wherein the step "determining whether the vehicle platoon is able to pass through the intersection by coordinating with the traffic signal" comprises the following sub steps: calculating an intersection passing time of a rearmost vehicle in the vehicle platoon according to the intersection distance information, the current speed command, the relative position information of the vehicles, and determining whether the intersection passing time of the rearmost vehicle is smaller than a sum of a remaining passing time of the traffic signal and a preset extending time; if yes, the vehicle platoon is able to pass through the intersection by coordinating with the traffic signal; the coordinating with the traffic signal includes requesting to the traffic signal to extend the remaining passing time by the preset extending time; and if not, the vehicle platoon is unable to pass through the intersection by coordinating with the traffic signal;

wherein the vehicle platoon intersection decision-making method comprises:

the computing device of at least one of the vehicles in the vehicle platoon determining whether a cut-in situation by an external vehicle occurs;

if yes, an overtaken vehicle in the vehicles executing a general following mode, and continuously determining whether the cut-in situation is ruled out;

when the cut-in situation is ruled out, the computing device of the overtaken vehicle determining whether the overtaken vehicle is able to catch up with a leading vehicle of the vehicles with the current speed command;

if the overtaken vehicle is able to catch up with the leading vehicle with the current speed command, the computing device of the overtaken vehicle transmitting a platoon forming request to the computing device of the captain vehicle through the communication device and executing a platoon forming process; and if the overtaken vehicle is unable to catch up with the captain vehicle with the current speed command, the computing device of the overtaken vehicle transmitting a deceleration request to the computing device of the captain vehicle through the communication device to request the captain vehicle to travel with deceleration, and then executing the platoon forming process.

8. The vehicle platoon intersection decision-making method as claimed in claim 7, wherein the step "determining whether the vehicle platoon is able to pass an intersection with a current speed command" includes the following sub-steps:

determining whether the signal status of the traffic signal is at a passing status according to the intersection signal information;

if the signal status of the traffic signal is at the passing status, calculating the intersection passing time of the rearmost vehicle in the vehicles according to the intersection distance information, the current speed command, the relative position information of the vehicles, and determining whether the intersection passing time of the rearmost vehicle is smaller than the remaining passing time of the traffic signal;

if the intersection passing time of the rearmost vehicle is smaller than the remaining passing time, the vehicle platoon is able to pass through the intersection with the current speed command;

if the intersection passing time of the rearmost vehicle is not smaller than the remaining passing time, the vehicle platoon is unable to pass through the intersection with the current speed command;

if the signal status of the traffic signal is at a non-passing status, calculating the intersection passing time of the rearmost vehicle in the vehicles according to the intersection distance information, the current speed command, the relative position information of the vehicles, determining whether the intersection passing time of the rearmost vehicle is larger than a remaining non-passing time of the traffic signal; and determining whether the intersection passing time of the rearmost vehicle minus the remaining non-passing time is smaller than a passing time of the traffic signal; and if both yes, the vehicle platoon is able to pass through the intersection with the current speed command.

9. The vehicle platoon intersection decision-making method as claimed in claim 7, wherein when executing the intersection decision-making process, first determining whether a cut-in situation by an external vehicle occurs; and if not, then determining whether the vehicle platoon is able to pass through the intersection with the current speed command.

10. The vehicle platoon intersection decision-making method as claimed in claim 7, wherein the first speed decision process includes:

generating a first optimized speed control information according to a preset decelerating value, so that the current speed command reduces to a coasting speed value;

continuously calculating an arrival time at the intersection according to a highest accelerating value, the current speed command, the intersection distance information, and determining whether the traffic signal is at a passing state when a frontmost vehicle of the vehicle platoon arrives at the intersection according to the arrival time;

if yes, determining the present time point to be an acceleration critical time point, adjusting the first optimized speed control information so that the current speed command increases by the highest accelerating value, so that the vehicle platoon passes through the intersection when the traffic signal turns to the passing state from the non-passing state; and if not, maintaining the first optimized speed control information according to the coasting speed value.

11. The vehicle platoon intersection decision-making method as claimed in claim 10, wherein the second speed decision process includes:

generating a second optimized speed control information according to an upper speed limit value and an upper acceleration limit value so that the current speed command increases to the upper speed limit value gradually.

* * * * *